3,636,163
METHOD OF PREPARING TRANSPARENT PRODUCTS CONSISTING LARGELY OF POLYEPIBROMOHYDRIN
Herbert Jenkner, Cologne-Deutz, and Walter Büttgens, Cologne-Gremberg, Germany, assignors to Chemische Fabrik Kalk G.m.b.H.
No Drawing. Filed Sept. 10, 1969, Ser. No. 856,795
Claims priority, application Germany, Sept. 12, 1968, P 17 93 404.2
Int. Cl. C07c 41/02, 43/00
U.S. Cl. 260—615 B  3 Claims

ABSTRACT OF THE DISCLOSURE

Light-colored polyepibromohydrin is made by polymerizing epibromohydrin with the aid of a Friedel-Crafts catalyst in the presence of an organic derivative of phosphonic acid, e.g., glycidyl phosphonic acid diethyl ester, triethyl phosphite, or the like, preferably in solution in an inert liquid solvent, e.g., a liquid halogenated hydrocarbon.

---

This invention relates to a method of preparing transparent products consisting largely of polyepibromohydrin.

It is known from British patent specification No. 477,843 to polymerise epoxy compounds in the presence of Friedel-Crafts catalysts. The polymers obtained are liquid to resinous and mostly yellow. But if epibromohydrin is polymerised by this method, the resultant polymer is such a dark brown that it cannot be used for many of its industrial applications, e.g., as a flameproofing agent for fibrous material.

A search has, therefore, been made for ways of preparing a virtually colourless polyepibromohydrin.

A method has been discovered for preparing transparent products consisting largely of polyepibromohydrin by polymerisation with the aid of Friedel-Crafts catalysts at temperatures of from −10° C. to +100° C., possibly in the presence of solvents. By this method polymerisation is carried out in the presence of one or more organic phosphorus compounds of the general formula

  (I)

  (II)

or

  (III)

in which R and R' are identical or different, saturated or unsaturated, aliphatic or aromatic hydrocarbon radicals, with 1 to 20 carbon atoms, possibly substituted by halogen or epoxy groups, m and n are each whole numbers from 0 to 3 and the sum of m+n equals 3, and the volatile components are distilled off from the resultant reaction product after the catalyst has been destroyed with an alcoholic sodium or potassium hydroxide solution.

Of the phosphorus compounds of the general formula

  (I)

  (II)

or

  (III)

in which R and R' are identical or different, saturated or unsaturated, aliphatic or aromatic hydrocarbon radicals with 1 to 20 carbon atoms, possibly substituted by halogen or epoxy groups, m and n are each whole numbers from 0 to 3 and the sum of m+n equals 3, glycidyl phosphonic acid diethyl ester, allyl phosphonic acid diallyl ester, bromoethyl phosphonic acid-bis-(bromoethyl)-ester, triallyl phosphite, triethyl phosphite, triphenyl phosphite, diethyl phosphine and triphenyl phosphine have proved to be particularly suitable. The Friedel-Crafts catalyst employed is preferably boron fluoride etherate, although aluminium halides such as aluminium chloride or aluminium bromide or antimony pentachloride, stannic tetrachloride, titanium tetrachloride, zinc chloride, stannic tetrabromide, titanium tetrabromide, zinc bromide, hydrofluoric acid, sulphuric acid or phosphoric acid may also be used. Boron fluoride may be used as a catalyst, not only in the form of its etherate, but also in the form of its dihydrate or as boron fluoride phosphoric acid, boron fluoride acetic acid, boron fluoride phenol or boron fluoride monoethylamine. The preferred inert organic solvents are: liquid halogenated hydrocarbons, such as chloroform, carbon tetrachloride, methylene chloride, dichloroethane, n-propyl chloride, isopropyl chloride, butyl chloride or isobutyl chloride; aliphatic hydrocarbons, such as with 5 carbon atoms; aromatic hydrocarbons such as benzene, toluene, xylene (pure isomers or isomer mixtures) or trimethyl benzenes; aliphatic ethers, such as diethyl ether, diisoamyl ether or mixed ethers; or the final reaction product itself. Chlorofluorohydrocarbons boiling from 40 to 140° C. may also be employed.

In carrying out the invention in practice, a reaction mixture is formed from epibromohydrin, the phosphorus compound, possibly the solvent, and the Friedel-Crafts catalyst. It is technically advantageous for the organic phosphorus compound, the catalyst and the solvent first to be mixed together and the epibromohydrin then added slowly to the mixture. To every 100 mol epibromohydrin 1 to 10 mol, preferably 2 to 6 mol, organic phosphorus compound of the above general Formulae I to III and 0.1 to 10 mol catalyst are required. The amount of solvent must be approximately 0.5 to 5 times that of epibromohydrin. Polymerisation is carried out at temperatures ranging from −10 to +100° C., preferably 20 to 40° C. It ceases directly when addition of the epibromohydrin to the reaction mixture is ended, so that the process can be a continuous one. In that case epibromohydrin, catalyst and phosphorus compound are added continuously to the polymer present and the reaction product is drawn off as it forms. No additional solvent is then required.

The resultant reaction mixture is as transparent as water or, at the most slightly yellowish in colour. When the reaction is over, alcoholic sodium or potassium hydroxide solution is added to it to destroy the catalyst. The catalyst may also be destroyed by mixing the reaction mixture with gaseous or aqueous ammonia, or an aqueous solution of sodium hydroxide, sodium hydrogen carbonate, sodium carbonate, potassium hydroxide or potassium carbonate. When neutralisation is over, the reaction mixture is separated from the aqueous solution of the neutralising agent. Another possibility is to neutralize the reaction mixture as well as destroy the catalyst by adding alkaline earth oxides, hydroxides or carbonates. Organic amines with up to 6 carbon atoms, such as mono-, di- or triethanolamine, may also be added to the reaction mixture to destroy the catalyst, or the catalyst may be destroyed by passing the mixture over suitable ion exchangers. The volatile constituents are then distilled off, leaving behind the desired product consisting largely of polyepibromohydrin, with water-like transparency or a slightly yellowish colour. Its molecular weight is approximately 500 to 1,000, its hydroxyl number 50 to 300, its bromine content 48 to 58% and its phosphorus content 0.2 to 2.5%. Its light colour and large bromine content make the product eminently suitable for flameproofing synthetic yarns and fibres.

Some examples of the method of the invention and a comparative example will now be given.

EXAMPLE 1 (COMPARISON)

5 parts by weight of boron fluoride etherate are stirred into 300 parts by weight of chloroform, then 274 parts by weight of epibromohydrin are added, drop by drop, at 20 to 25° C. The reaction mixture initially takes on a light to dark yellow colour and ends up dark brown, when all the epibromohydrin has been added. 3.5 parts by weight of a 20% solution of sodium hydroxide is methanol are added to destroy the catalyst, and the volatile constituents are distilled off. This leaves 233 parts by weight of a dark brown, viscous product, with a hydroxyl number of 135 and a bromine content of 56.4%. The material has such a dark colour that it could not be used as a flameproofing agent.

EXAMPLE 2 (INVENTION)

5 parts by weight of boron fluoride etherate and 19.4 parts by weight of glycidyl phosphonic acid diethyl ester are stirred into 300 parts by weight of chloroform, then 274 parts of epibromohydrin are added drop by drop at 20 to 25° C. During the whole reaction the mixture remains light yellow. 3.5 parts of a 20% solution of sodium hydroxide in methanol are added to it to destroy the catalyst, and the volatile constituents are distilled off. 151 parts by weight of a light yellow product are obtained, consisting largely of polyepibromohydrin; it contains 48.6% by weight of bromine and 2.1% of phosphorus, has a hydroxyl number of 148 and a molecular weight of 710.

EXAMPLE 3 (INVENTION)

Epibromohydrin is polymerised as described in Example 2, except that 13 parts by weight of triethyl phosphite are added as the phosphorus compound. A light yellow product is obtained, consisting mainly of polyepibromohydrin.

EXAMPLE 4

Epibromohydrin is polymerised by the method described in Example 2 and 20.3 parts by weight of bromoethyl phosphonic acid-bis-(bromomethyl)-ester are added as the phosphorus compound. This yields 188 parts by weight of a product consisting largely of polyepibromohydrin, with the transparency of water. The product has a molecular weight of 500, a bromine content of 55.6%, a phosphorus content of 0.9% and a hydroxyl number of 83.

EXAMPLE 5 (INVENTION)

Epibromohydrin is polymerised by the method of Example 2, 20.2 parts by weight of allyl phosphonic acid diallyl ester being added as the phosphorus compound. A low viscosity, water-like product is obtained, consisting largely of polyepibromohydrin and having a hydroxyl number of 128.

The fact that the polyepibromohydrin products prepared in accordance with Examples 2 to 5 are colourless or, at the most, light yellow makes them eminently suitable for use as flameproofing additives for synthetic yarns.

What we claim is:

1. A method of preparing transparent products comprising polyepibromohydrin, by polymerizing epibromohydrin in the presence of a Friedel-Crafts catalyst, at temperatures from −10 to +100° C., and in the presence of organic phosphorus compounds of the general formulae $$R_m\overset{O}{\underset{\|}{P}}\cdot(OR')_n \qquad (I)$$

$$R_mP\cdot(OR')_n \qquad (II)$$

or $$H\overset{O}{\underset{\|}{P}}\cdot(OR')_2 \qquad (III)$$

in which R and R' are identical or different, saturated or unsaturated, aliphatic or aromatic hydrocarbon radicals with 1 to 20 carbon atoms, $m$ and $n$ is each a whole number from 0 to 3 and the sum of $m+n$ equals 3 and distilling off volatile constituents from the resultant reaction product after the catalyst has been destroyed with an alcoholic sodium or potassium hydroxide solution.

2. The method of claim 1, characterised in that the organic phosphorus compounds are added in quantities ranging from 1 to 10 mol.

3. A method as defined in claim 1 wherein the polymerization is carried out in the presence of an inert organic solvent and wherein the organic phosphorus compounds are added in quantities ranging from 2 to 6 mol.

References Cited

FOREIGN PATENTS 477,843    1/1938    Great Britain _____ 260—615 B

HOWARD T. MARS, Primary Examiner

U.S. Cl. X.R.

117—137